(12) United States Patent
Tsubota et al.

(10) Patent No.: US 6,283,562 B1
(45) Date of Patent: Sep. 4, 2001

(54) TRIANGULAR CRAWLER APPARATUS

(75) Inventors: Haruhiro Tsubota, Fujisawa; Hikosaburo Hiraki, Oyama; Kazutoshi Hori, Katano, all of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/230,611

(22) PCT Filed: Jul. 29, 1997

(86) PCT No.: PCT/JP97/02631

§ 371 Date: Jan. 28, 1999

§ 102(e) Date: Jan. 28, 1999

(87) PCT Pub. No.: WO98/04451

PCT Pub. Date: Feb. 5, 1998

(30) Foreign Application Priority Data

Jul. 31, 1996 (JP) .................................................. 8-218023

(51) Int. Cl.$^7$ ........................... B62D 55/14; B62D 55/00; B60K 17/14; B60K 17/00
(52) U.S. Cl. ........................ 305/135; 305/15; 305/124; 180/9.21; 180/9.5; 180/308
(58) Field of Search .................................. 305/124, 129, 305/130, 135 I, 139, 142, 138, 15, 132; 180/6.7, 9.21, 9.5, 9.52, 89.1, 305, 308, 4.1, 9.1

(56) References Cited

U.S. PATENT DOCUMENTS

| 2,685,777 | * | 8/1954 | Plas | 180/41 |
|---|---|---|---|---|
| 2,967,578 | * | 1/1961 | Schomers | 180/41 |
| 3,583,509 | * | 6/1971 | Stachnik | 180/9.5 |
| 3,869,010 | * | 3/1975 | Stedman | 180/9.5 |
| 4,114,737 | * | 9/1978 | Fukui | 180/305 |
| 4,253,708 | * | 3/1981 | Haslett | 305/139 |
| 5,273,126 | * | 12/1993 | Reed et al. | 305/132 |
| 5,452,949 | * | 9/1995 | Kelderman | 305/129 |
| 5,873,640 | * | 2/1999 | Oertley | 305/138 |
| 5,899,543 | * | 5/1999 | Lykken et al. | 305/124 |
| 5,954,148 | * | 9/1999 | Okumura et al. | 180/9.21 |
| 6,007,166 | * | 12/1999 | Tucker et al. | 305/135 |
| 6,164,399 | * | 12/2000 | Bays | 180/9.5 |

FOREIGN PATENT DOCUMENTS

| 3-79421 | 4/1991 | (JP) . |
| 4-8682 | 1/1992 | (JP) . |
| 97 37885 | 10/1997 | (WO) . |

* cited by examiner

Primary Examiner—S. Joseph Morano
Assistant Examiner—Jason R. Bellinger
(74) Attorney, Agent, or Firm—Sidley Austin Brown & Wood

(57) ABSTRACT

A triangular crawler device, which is free from being stumbled and whose crawler belt does not come off from a body of a vehicle while the vehicle travels, includes a track frame (10), having a front idler (15A) and a rear idler (15B) disposed at the front and rear ends thereof respectively; a sprocket (20), rotatably fixed to the track frame (10); links (11, 13), for connecting the body (2) of the vehicle (1) and the track frame (10) together; and a crawler belt (17), wound around the front idler (15A), the rear idler (15B) and the sprocket (20).

13 Claims, 5 Drawing Sheets

F I G. 9
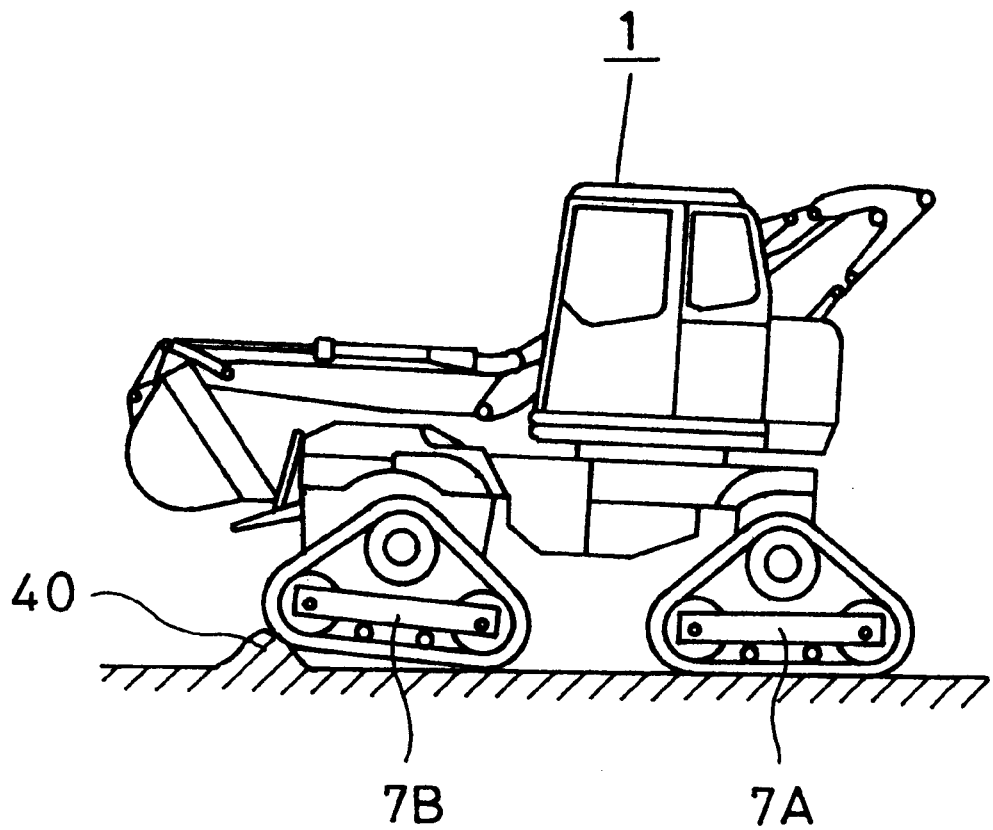

TRIANGULAR CRAWLER APPARATUS

TECHNICAL FIELD

The present invention relates to a pair of triangular crawler devices on opposite sides provided at either or both of the front and rear portions of a self-traveling vehicle, such as construction equipment, or the like.

BACKGROUND ART

A triangular crawler device in construction equipment will be explained with FIG. 1. A revolving superstructure 3 is mounted on a body 2 of construction equipment 1. A working machine 4 having a bucket or the like, a driver's cab 5, an engine compartment 6, and the like are attached to the revolving superstructure 3. The body 2 is provided with triangular crawler devices 7 which are travel devices. Specifically, a pair of rear triangular crawler devices 7A on opposite sides, each having a driving element, are disposed at the rear portion of the vehicle 2, and a pair of front triangular crawler devices 7B on opposite sides, each having a driving element and a steering device, are disposed at the front portion of the vehicle 2.

An example of such triangular crawler devices as above is described in Japanese Patent Laid-open No. 4-8682. Specifically, a track frame, including a front idler and a rear idler at the front and rear ends thereof respectively, is rotatably attached to a sprocket axle via a bearing. A crawler belt is wound around the outer peripheries of the sprocket and the front and rear idlers, and forms a triangular shape. Thus, when the vehicle travels on rough ground, the track frame rocks with the sprocket axle as a center following the lay of the ground, which reduces the rocking of the vehicle.

However, the above configuration has a disadvantage in that the front portion of the front triangular crawler device 7B does not always turn upwardly but can turn downwardly, depending on conditions, to thereby cause it to stumble when the front idler collides with an obstacle in front while the vehicle travels.

SUMMARY OF THE INVENTION

The present inventors proposed a triangular crawler device disclosed in unpublished Japanese Application Patent No. 8-113219, to solve the aforesaid disadvantage. In FIGS. 6 and 7, which are concerned with the unpublished proposal, a sprocket 30 is attached to a body 2 of a vehicle, and the body 2 and the front portion of a track frame 31 are connected via pivot pins 33A and 33B and a front link 32. The body 2 and the rear portion of the track frame 31 are connected via pivot pins 35A and 35B and a rear link 34. The body 2, the track frame 31, the front link 32, and the rear link 34 compose a four-node linkage. A distance L4 between the lower connecting pins 33B and 35B is shorter than a distance L3 between the upper connecting pins—33A and 35A. A front idler ISA and a rear idler 15B are attached to the front and rear ends of the track frame 31 respectively. Plural rollers 16 are attached to the lower face of the track frame 31. A crawler belt 17 is wound around the outer peripheries of the sprocket 30, the front idler 15A, the rear idler 15B, and the rollers 16.

When force is applied to the front idler 15A in the direction of an arrow F, that is, from the front as shown in FIG. 8, the track frame 31 rocks backwardly. At this time, however, the distance L4 between the lower connecting pins 33B and 35B of the four-node link is shorter than the distance L3 between the upper connecting pins 33A and 35A, as described above. Therefore, the front idler 15A moves backwardly and upwardly, as shown with a broken line arrow d, and simultaneously the rear idler 15B moves backwardly and downwardly, as shown with a broken line arrow e. Accordingly, a front triangular crawler device 7B moves from a position shown with a two-dot chain line to a position shown with a full line in such a manner that the front portion thereof turns upwardly, and is postured to go over an obstacle 40 in front as shown in FIG. 9, whereby it is no longer stumbled.

However, in the configuration of the above unpublished proposal, the sprocket 30 is attached to the body 2, and the track frame 31 is attached to the body 2 via the front link 32 and the rear link 34 so as to freely rock. Thus, when the track frame 31 rocks, the shape of a triangle xyz, formed by the center x of the sprocket 30, the center y of the front idler 15A, and the center z of the rear idler 15B as shown in FIG. 6, changes. Consequently, the length of the outer peripheries of the sprocket 30 and the front and rear idlers 15A and 15B become shortened so that the crawler belt 17 loosens, which causes the situation that the crawler belt 17 easily comes off from the vehicle body 2.

The present invention is made in view of the aforesaid disadvantage and an object thereof is to provide a triangular crawler device which is free from stumbling and whose crawler belt does not come off from the body of the vehicle while the vehicle travels.

According to the present invention, each one of a pair of triangular crawler devices, provided on opposite sides of at least one of the front and rear portions of a vehicle, is a triangular crawler device having a sprocket, front and rear idlers disposed below and in forward and backward directions from the sprocket, and a crawler belt wound around the sprocket and the front and rear idlers, including:

a track frame, having the front idler and the rear idler disposed at front and rear ends thereof, the sprocket being rotatably mounted on the track frame, links, connecting a body of the vehicle and the track frame together, and the crawler belt being wound around the front idler, the rear idler, and the sprocket.

According to this configuration, the track frame and the sprocket integrally rock in the forward and backward directions relative to the vehicle body. At this time, the shape of a triangle, formed by the respective centers of the sprocket, the front idler, and the rear idler, does not change. Thus, the length of the outer peripheries of the sprocket and the front and rear idlers does not change. Consequently, there is no possibility of the crawler belt loosening and coming off of the vehicle body.

Moreover, it is preferable that the links form a four-node linkage with two links which are each attached to the body at a first end and attached to the track frame at the second end with pivot pins, and the four-node linkage has a distance between pivot pins at the second ends of the two links which is shorter than a distance between the pivot pins at the first ends of the two links.

According to this configuration, when the track frame collides with an obstacle in front and moves backwardly, the front idler moves backwardly and upwardly and the rear idler moves backwardly and downwardly. Hence, the triangular crawler device turns upwardly at the front portion thereof and is postured to go over the obstacle, whereby it is no longer stumbled.

Furthermore, it is possible that a hydraulic motor is fixed to the track frame and the hydraulic motor rotationally drives the sprocket. Alternately, the sprocket and a driving source on the body can be connected with a universal joint and the sprocket can be rotationally driven via the universal joint.

According to this configuration, even when the track frame and the sprocket integrally rock in the forward and backward directions relative to the vehicle body, the sprocket can rotate, whereby the vehicle can travel.

BRIEF DESCRIPTION OF THE DRAWINGS

FIG. 9 is a side elevational view showing the posture of construction equipment provided with the triangular crawler device in FIG. 6 when it travels on the rough ground.

BEST MODE FOR CARRYING OUT THE INVENTION

The preferable embodiments of the present invention, are described in detail below, with reference to the attached drawings.

Figure 1:
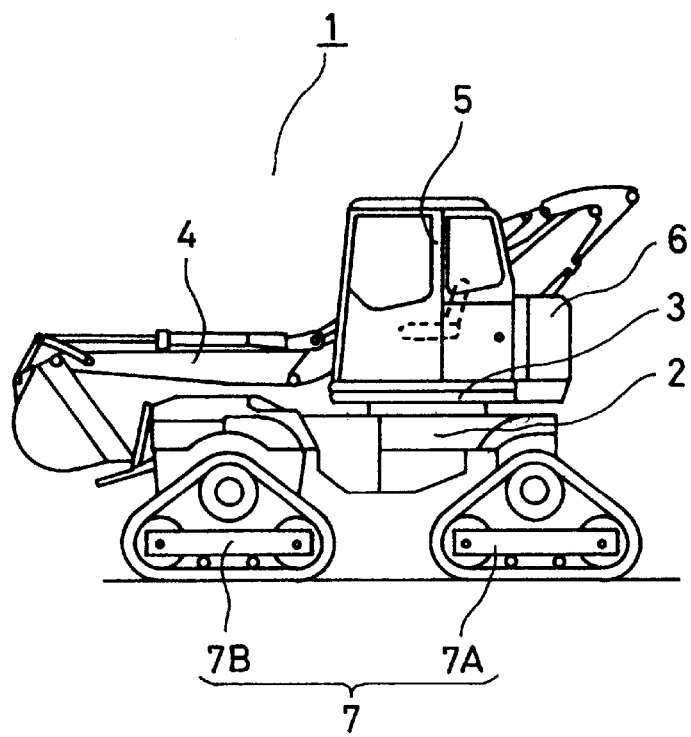
FIG. 1 is a side elevational view of construction equipment provided with triangular crawler devices according to the present invention.
Figure 2:
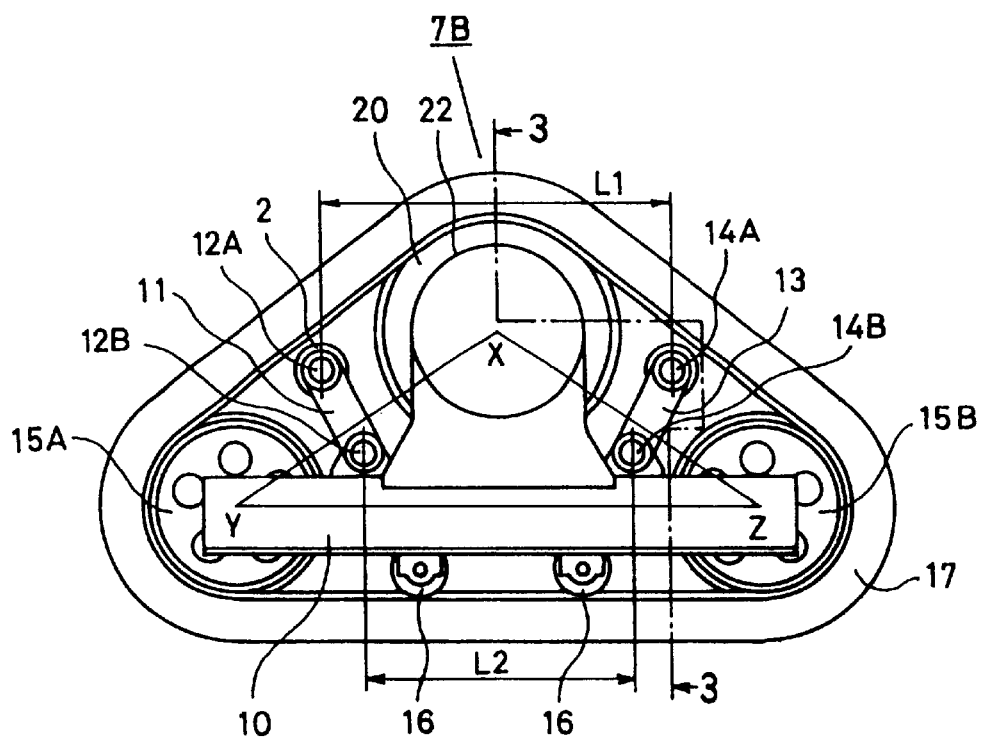
FIG. 2 is a side elevational view of a front triangular crawler device in a first embodiment of a triangular crawler device according to the present invention.
Figure 3:
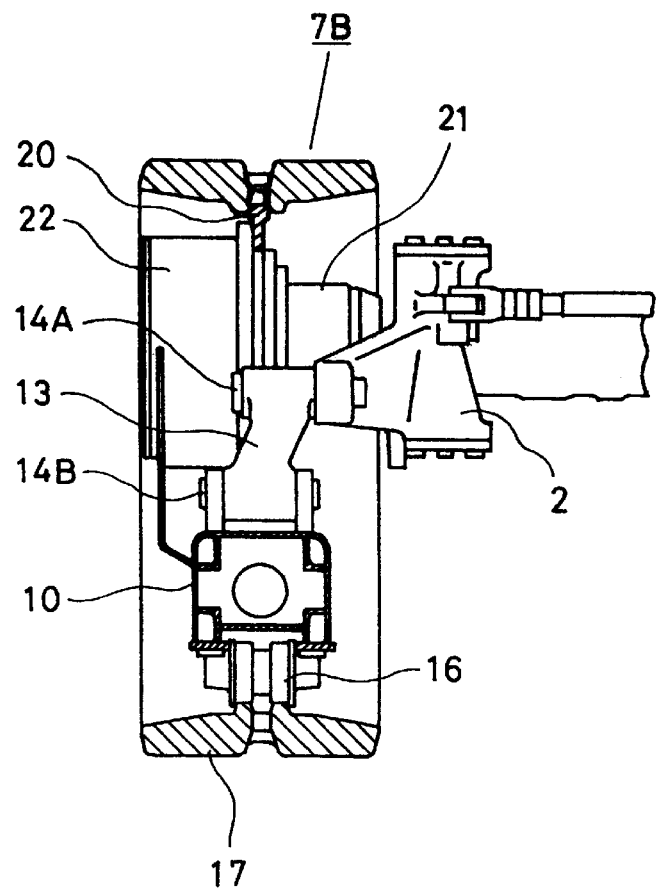
FIG. 3 is a sectional view taken along line 3—3 in FIG. 2.

In FIGS. 2 and 3, a body 2 and the front portion of a track frame 10 are connected via pivot pins 12A and 12B and a front link 11. The body 2 and the rear portion of the track frame 10 are connected via pivot pins 14A and 14B and a rear link 13. The body 2, the track frame 10, the front link 11, and the rear link 13 compose a four-node linkage. A distance L2 between the lower pivot pins 12B and 14B is shorter than a distance L1 between the upper pivot pins 12A and 14A.

A hydraulic drive motor 21 and a reducer 22, provided with a rotatable sprocket 20, are fixed to the upper portion of the track frame 10. The hydraulic drive motor 21 is connected to hydraulic equipment on the side of the body 2 via a flexible conduit (not shown). A front idler 15A is attached to the front end of the track frame 10 and a rear idler 15B is attached to the rear end thereof. A plurality (for example, two in this embodiment) of rollers 16 is attached to the lower face of the track frame 10. A crawler belt 17 is wound around the outer peripheries of the sprocket 20, the front idler 15A, the rear idler 15B, and the rollers 16.

Figure 4:
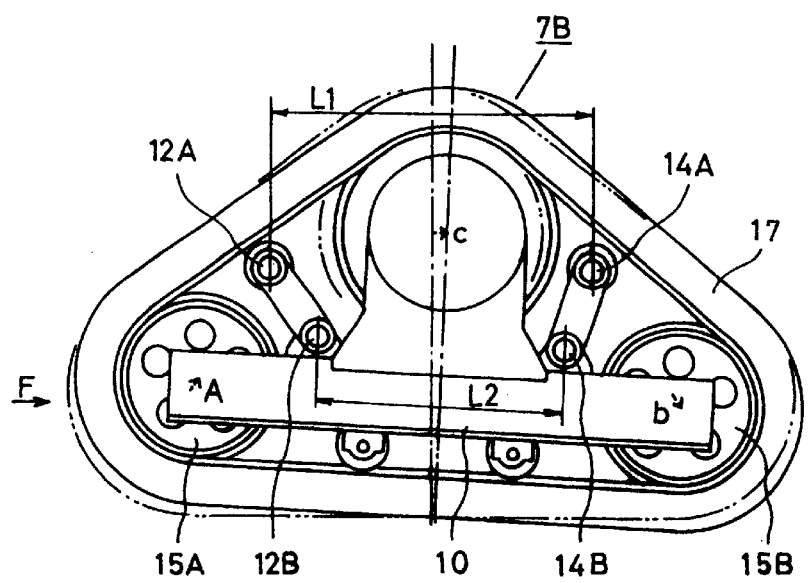
FIG. 4 is a side elevational view showing a case where a four-node linkage is deformed by force being applied to the front triangular crawler device in FIG. 2.

As shown in FIG. 4, when a force is applied to the front idler 15A from the front as shown with the arrow F, the track frame 10 rocks backwardly. However, at this time the distance L2 between the lower pivot pins 12B and 14B of the four-node linkage is shorter than the distance L1 between the upper pivot pins 12A and 14A, as described above. Therefore, the center of the front idler 15A moves backwardly and upwardly as shown with the broken line arrow A, the center of the rear idler 15B moves backwardly and downwardly as shown with the broken line arrow b, and the center of the sprocket 20 moves laterally as shown with the broken line arrow c. As described above, the hydraulic drive motor 21 is connected to the body 2 through the flexible conduit. Thus, there arises no trouble even if the positions of the hydraulic motor 21 and the body 2 are not matched. Accordingly, a front crawler device 7B moves from the position shown with a two-dot chain line to the position shown with a full line in such a manner that the front portion thereof turns upwardly, and is postured to go over an obstacle 40 in front as shown in FIG. 9, that is, it is no longer stumbled.

The sprocket 20 is rotatably attached to the track frame 10. Thus, when the track frame 10 rocks, the sprocket 20 moves along with the front and rear idlers 15A and 15B, whereby the shape of the triangle XYZ, formed by the respective center positions shown in FIG. 2, does not change. Consequently, the length of the outer peripheries, of the sprocket 20 and the front and rear idlers 15A and 15B, does not change so that the crawler belt 17 does not loosen, which can decrease the rate of occurrence of the crawler belt coming off of the vehicle body.

Figure 5:
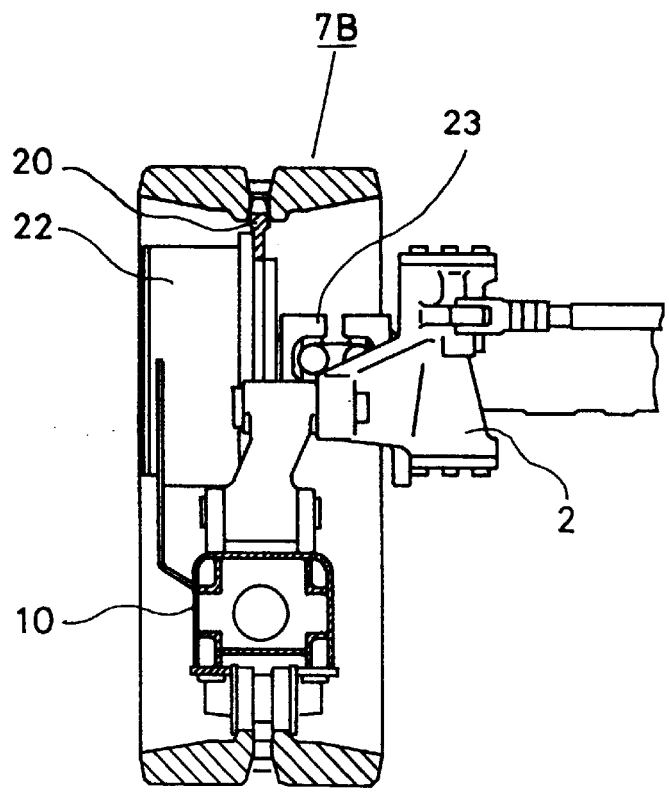
FIG. 5 is a front sectional view of a front triangular crawler device in a second embodiment of the triangular crawler device according to the present invention.
Figure 6:
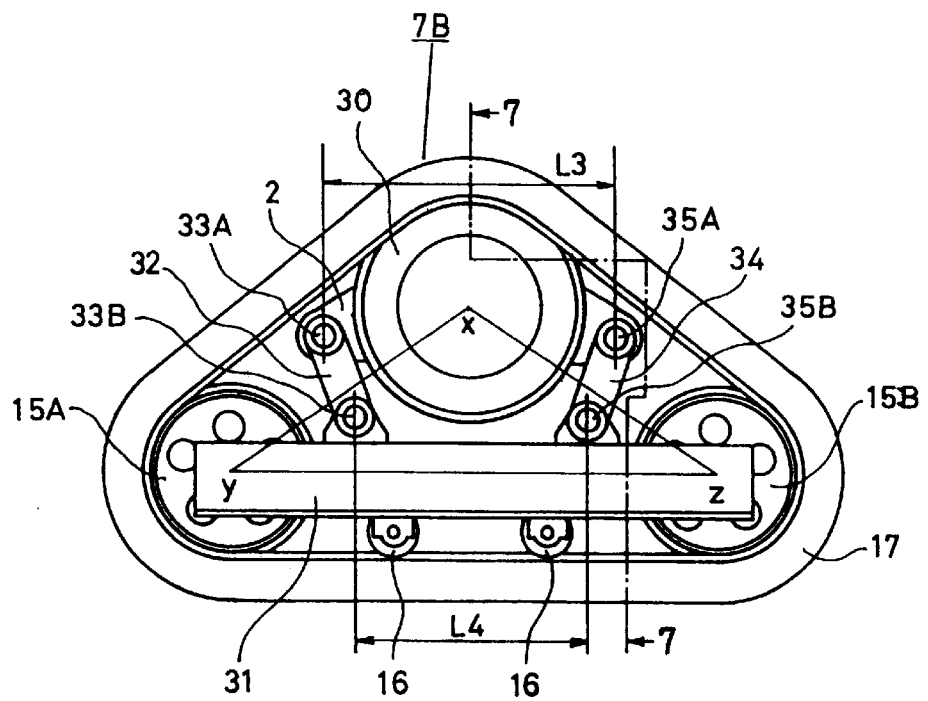
FIG. 6 is a side elevational view of a front triangular crawler device according to an unpublished proposed art.
Figure 7:
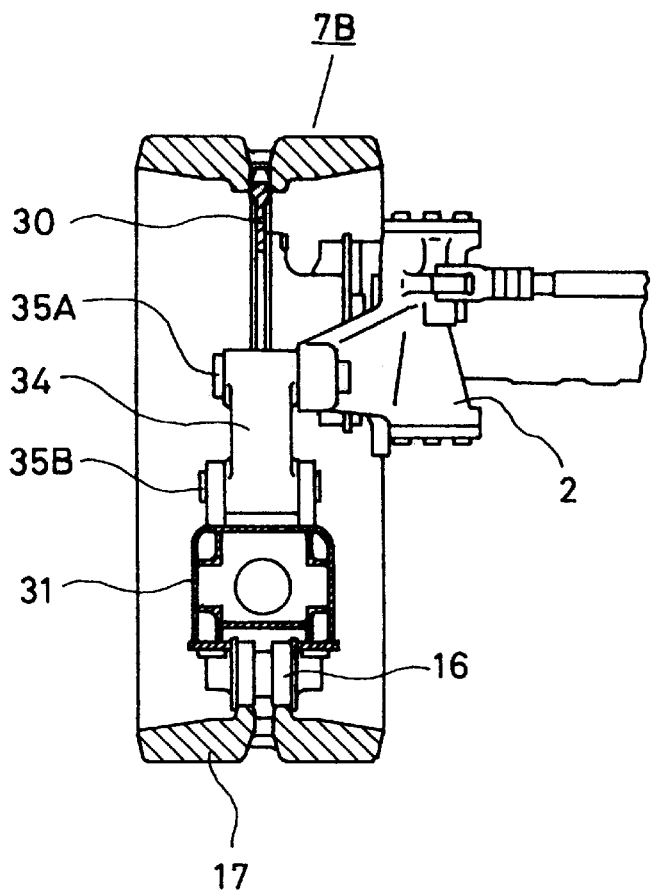
FIG. 7 is a sectional view taken along the 7—7 line in FIG. 6.
Figure 8:
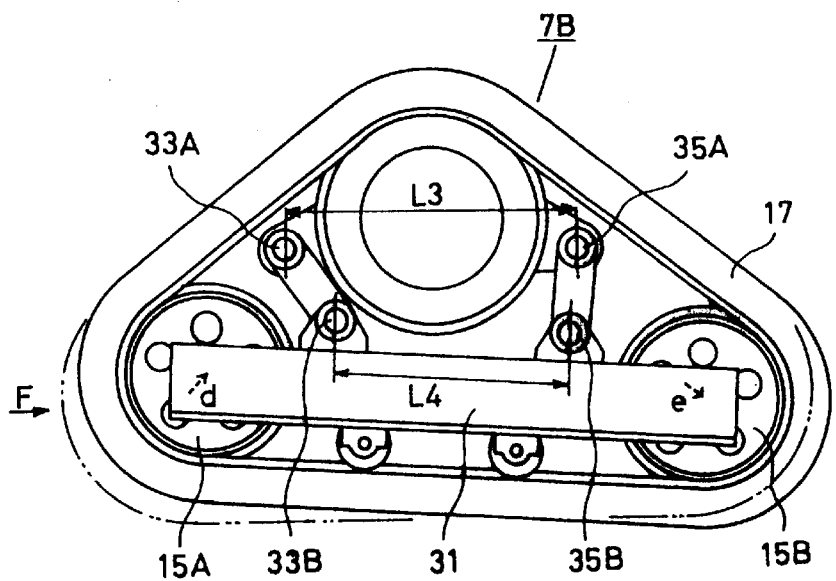
FIG. 8 is a side elevational view showing a case where a four-node link is deformed by force being applied to the front triangular crawler device in FIG. 6.

FIG. 5 is a second embodiment in which the reducer 22, having the rotatable sprocket 20, is attached to the track frame 10. The reducer 22 and a power source on the body 2 are connected with a universal joint 23. Accordingly, there arises no trouble even if the center position of the sprocket 20 does not match to the body 2 as described above. Since the remainder of the configuration, operation and effect are the same as those in the first embodiment, the explanation thereof is omitted.

INDUSTRIAL AVAILABILITY

The present invention is useful as a triangular crawler device which is free from being stumbled and whose crawler belt does not come off of a body of a vehicle while the vehicle travels.

What is claimed is:

1. A triangular crawler device comprising:
   a track frame, having a front end portion and a rear end portion;
   a sprocket, which is rotatably mounted on said track frame;
   a front idler, which is disposed below and forward of said sprocket and which is disposed at said front end portion of said track frame;
   a rear idler, which is disposed below and rearward of said sprocket and which is disposed at said rear end portion of said track frame;
   two links, each connecting said track frame to a vehicle body; and
   a crawler belt, which is wound around said sprocket, said front idler, and said rear idler.

2. A triangular crawler device in accordance with claim 1, further comprising a hydraulic motor fixed to said track frame, wherein said hydraulic motor can rotationally drive said sprocket.

3. A triangular crawler device in accordance with claim 1, further comprising means for connecting said sprocket to a driving source on said vehicle body via a universal joint so that said sprocket can be rotationally driven via said universal joint.

4. A triangular crawler device in accordance with claim 1, wherein a first end of each one of said two links is attachable to said vehicle body by a respective first pivot pin, and a second end of each one of said two links is attached to said track frame by a respective second pivot pin, to form a four-node linkage, and wherein a distance between said second pivot pins is shorter than a distance between first pivot pins when said first pivot pins are attached to the vehicle body.

5. A triangular crawler device in accordance with claim 4, further comprising a hydraulic motor fixed to said track frame, wherein said hydraulic motor can rotationally drive said sprocket.

6. A triangular crawler device in accordance with claim 4, further comprising means for connecting said sprocket to a driving source on said vehicle body via a universal joint so that said sprocket can be rotationally driven via said universal joint.

7. A vehicle having a vehicle body and at least one pair of triangular crawler devices positioned on opposite sides of said vehicle body, each said triangular crawler device comprising:
- a track frame, having a front end portion and a rear end portion;
- a sprocket, which is rotatably mounted on said track frame;
- a front idler, which is disposed below and forward of said sprocket and which is disposed at said front end portion of said track frame;
- a rear idler, which is disposed below and rearward of said sprocket and which is disposed at said rear end portion of said track frame;
- two links, each connecting said track frame to said vehicle body; and
- a crawler belt, which is wound around said sprocket, said front idler, and said rear idler.

8. A vehicle in accordance with claim 7, wherein each triangular crawler device further comprises a hydraulic motor fixed to said track frame so that said hydraulic motor can rotationally drive said sprocket.

9. A vehicle in accordance with claim 7, wherein in each triangular crawler device said sprocket and a driving source on said vehicle body are connected via a universal joint so that said sprocket can be rotationally driven via said universal joint.

10. A vehicle in accordance with claim 7, wherein in each triangular crawler device a first end of each one of said two links is attached to said vehicle body by a respective first pivot pin, and a second end of each one of said two links is attached to said track frame by a respective second pivot pin, to form a four-node linkage, and wherein a distance between said second pivot pins is shorter than a distance between first pivot pins.

11. A vehicle in accordance with claim 10, wherein each triangular crawler device further comprises a hydraulic motor fixed to said track frame so that said hydraulic motor can rotationally drive said sprocket.

12. A vehicle in accordance with claim 10, wherein in each triangular crawler device said sprocket and a driving source on said vehicle body are connected via a universal joint so that said sprocket can be rotationally driven via said universal joint.

13. A vehicle in accordance with claim 7, wherein said at least one pair of triangular crawler devices positioned on opposite sides of said vehicle body comprises a front pair of triangular crawler devices positioned on opposite sides of a front portion of said vehicle body and a rear pair of triangular crawler devices positioned on opposite sides of a rear portion of said vehicle body.

\* \* \* \* \*